United States Patent
Ryu et al.

(10) Patent No.: US 9,460,032 B2
(45) Date of Patent: Oct. 4, 2016

(54) APPARATUS AND METHOD FOR PROCESSING AN INTERRUPT

(75) Inventors: Jae-Min Ryu, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 13/177,988

(22) Filed: Jul. 7, 2011

(65) Prior Publication Data

US 2012/0089761 A1    Apr. 12, 2012

(30) Foreign Application Priority Data

Oct. 8, 2010  (KR) ........................ 10-2010-0098405

(51) Int. Cl.
  *G06F 13/24*   (2006.01)
  *G06F 11/20*   (2006.01)

(52) U.S. Cl.
  CPC .............. *G06F 13/24* (2013.01); *G06F 11/20* (2013.01)

(58) Field of Classification Search
  CPC ................................ G06F 13/24; G06F 11/20
  USPC .................................. 710/268, 110
  See application file for complete search history.

(56) References Cited

U.S. PATENT DOCUMENTS

| | | | | | |
|---|---|---|---|---|---|
| 5,774,436 | A * | 6/1998 | Jeong | ........................ | 369/47.55 |
| 5,802,378 | A * | 9/1998 | Arndt et al. | .................. | 710/267 |
| 6,742,065 | B1 * | 5/2004 | Suh | ............... | 710/260 |
| 6,968,412 | B1 * | 11/2005 | Nalawadi | ...................... | 710/261 |
| 7,200,700 | B2 * | 4/2007 | Chen | ............................ | 710/266 |
| 7,200,701 | B2 * | 4/2007 | Stultz | ............................ | 710/267 |
| 7,328,294 | B2 * | 2/2008 | Kim | ..................... | G06F 9/5011 710/260 |
| 7,451,454 | B2 * | 11/2008 | Chen et al. | ................... | 719/318 |
| 7,721,024 | B2 * | 5/2010 | Stultz | .............................. | 710/48 |
| 7,809,876 | B2 * | 10/2010 | Balasubramanian | ..................... | G05B 19/0421 710/260 |
| 7,882,293 | B2 * | 2/2011 | Burdass et al. | ............... | 710/262 |
| 7,899,966 | B2 * | 3/2011 | Kulkarni | .............. | G06F 9/4812 710/261 |
| 7,962,679 | B2 * | 6/2011 | van de Ven | ................... | 710/261 |
| 8,234,431 | B2 * | 7/2012 | Kruglick | ................. | G06F 13/24 710/200 |
| 8,356,130 | B2 * | 1/2013 | Strauss et al. | ................ | 710/263 |
| 8,473,662 | B2 * | 6/2013 | Lim et al. | ..................... | 710/261 |
| 2002/0016880 | A1 * | 2/2002 | Bhagat | .......................... | 710/261 |
| 2002/0065646 | A1 * | 5/2002 | Waldie et al. | ................. | 703/26 |
| 2002/0156958 | A1 * | 10/2002 | Huang | .......................... | 710/260 |
| 2002/0166018 | A1 * | 11/2002 | Kim | ........................... | 710/260 |
| 2006/0047876 | A1 * | 3/2006 | Stultz | ............................ | 710/260 |
| 2006/0136642 | A1 * | 6/2006 | Ooi | ................................ | 710/268 |
| 2009/0172229 | A1 * | 7/2009 | Zmudzinski | .................. | 710/260 |
| 2009/0172423 | A1 * | 7/2009 | Song et al. | ................... | 713/300 |
| 2009/0198850 | A1 * | 8/2009 | Suzuki | ........................... | 710/267 |
| 2009/0248934 | A1 * | 10/2009 | Ge et al. | ....................... | 710/261 |
| 2011/0271142 | A1 * | 11/2011 | Zimmer et al. | ................. | 714/10 |

FOREIGN PATENT DOCUMENTS

| | | |
|---|---|---|
| JP | 08-161280 | 6/1996 |
| JP | 11-345135 | 12/1999 |
| KR | 10-2008-0048307 | 6/2008 |

* cited by examiner

*Primary Examiner* — Henry Tsai
*Assistant Examiner* — Christopher a Daley
(74) *Attorney, Agent, or Firm* — NSIP Law

(57) ABSTRACT

Provided are an apparatus and method for processing an interrupt. The apparatus includes a plurality of processing cores that are each configured to process an interrupt. The apparatus also includes an interrupt distributing unit configured to receive the interrupt, determine whether or not execution mode of each processing core is IRQ mode for exception processing or interrupt processing, and provide the received interrupt to a processing core that is not in IRQ mode.

9 Claims, 5 Drawing Sheets

US 9,460,032 B2

APPARATUS AND METHOD FOR PROCESSING AN INTERRUPT

CROSS-REFERENCE TO RELATED APPLICATION(S)

This application claims the benefit under 35 U.S.C. §119 (a) of Korean Patent Application No. 10-2010-0098405, filed on Oct. 8, 2010, in the Korean Intellectual Property Office, the entire disclosure of which is incorporated herein by reference for all purposes.

BACKGROUND

1. Field

The following description relates to interrupt processing, and additionally, to interrupt processing in a multiprocessor that includes a plurality of CPUs.

2. Description of the Related Art

Interrupt latency corresponds to a delay time that is spent on interrupt processing, and is an important factor that affects system performance. As an example, if interrupt latency is increased due to unexpected events in information communication devices that are expected to implement real-time properties, the response time may be proportionally increased. As a result, a signal may be blocked or an image may not be properly output on a display.

In addition, a multiprocessor that includes multiple central processing units (CPUs) that are currently being used in the information communication devices. Therefore, methods for efficiently processing an interrupt in the multiprocessor are actively being researched.

To process the interrupt more efficiently in a multiprocessor, an amount of interrupts are measured for each CPU at the time of processing interrupt. In doing so, a balance of an interrupt occurrence rate can be maintained. However, the above method of measuring the amount of interrupts takes into consideration only a system status before the interrupt occurs not a system status at the time of the occurrence of the interrupt. Accordingly, this method is not efficient for the recent information communication devices in which various types of interrupts take place due to interaction with a user and internal operation of the device.

Moreover, if an interrupt occurs while another interrupt is being processed by a particular CPU, the newly occurring interrupt may stop the previously executed interrupt. Accordingly, latency of the stopped interrupt may be delayed until the processing of the new interrupt is completed.

SUMMARY

In one general aspect, there is provided an apparatus for processing an interrupt, the apparatus including a plurality of processing cores each configured to process an interrupt, an interrupt distributing unit configured to receive the interrupt, determine whether or not execution mode of each processing core is in interrupt request (IRQ) mode for interrupt processing, and provide the received interrupt to a processing core that is not in IRQ mode.

In response to a plurality of processing cores not being in IRQ mode, the interrupt distributing unit may be further configured to select a processing core from among the plurality of processing cores not in IRQ mode, in consideration of a performance of each processing core, and provide the interrupt to the selected processing core.

The performance may comprise information about at least one of the number of received interrupts of each processing core, the usage of each processing core, the utilization of each processing core, and the workload of each processing core.

In another aspect, there is provided an apparatus for processing an interrupt, the apparatus including a plurality of processing cores, a monitor unit configured to detect status/performance information of each processing core, and an interrupt distributing unit configured to provide a received interrupt to one of the processing cores based on the detected status/performance information.

The monitor unit may comprise a first monitor unit configured to detect an execution mode of each processing core of the plurality of processing cores.

The interrupt distributing unit may be further configured to provide the interrupt to a processing core that is detected as not being in interrupt request (IRQ) mode.

The monitor unit may further comprise a second monitor unit configured to detect an interrupt masking status of each processing core of the plurality of processing cores.

The interrupt distributing unit may be further configured to select a plurality of processing cores that are detected as not being in IRQ mode, and provide the interrupt to a processing core from among the plurality of selected processing cores based on the interrupt masking status.

The monitor unit may further comprise a third monitor unit configured to detect the number of interrupts received by each processing core and utilization of the each processing core.

The interrupt distributing unit may be further configured to primarily select processing cores which are detected as not being in IRQ mode, secondly select processing cores from the primarily selected processing cores based on the interrupt masking status, and finally select one processing core from the secondly selected processing cores based on the number of interrupts or the utilization of the secondly selected processing cores, and provide the interrupt to the finally selected processing core.

In another aspect, there is provided a method for processing an interrupt in a device comprising multiple processing cores, the method including detecting status/performance information of each processing core of the plurality of processing cores, and providing a received interrupt to one of the processing cores based on the detected status/performance information.

The detecting of the status/performance information may comprise detecting an execution mode of each processing core.

The providing of the received interrupt may comprise providing the interrupt to a processing core that is detected as not being in IRQ mode.

The detecting of the status/performance information may further comprise detecting an interrupt masking status of each processing core of the plurality of processing cores.

The providing of the received interrupt may comprise selecting a plurality of processing cores that are detected as not being in IRQ mode, and providing the interrupt to a processing core from among the plurality of selected processing cores based on the interrupt masking status.

The detecting of the status/performance information may comprise detecting the number of interrupts received by each processing core and utilization of the each processing core.

The providing of the received interrupt may comprise primarily selecting processing cores that are detected as not being in IRQ mode, secondly selecting processing cores from the firstly selected processing cores based on the interrupt masking status, finally selecting one processing core from the secondly selected processing cores based on the number of interrupts or the utilization, and providing the interrupt to the finally selected processing core.

Other features and aspects may be apparent from the following detailed description, the drawings, and the claims.

Figure 1:
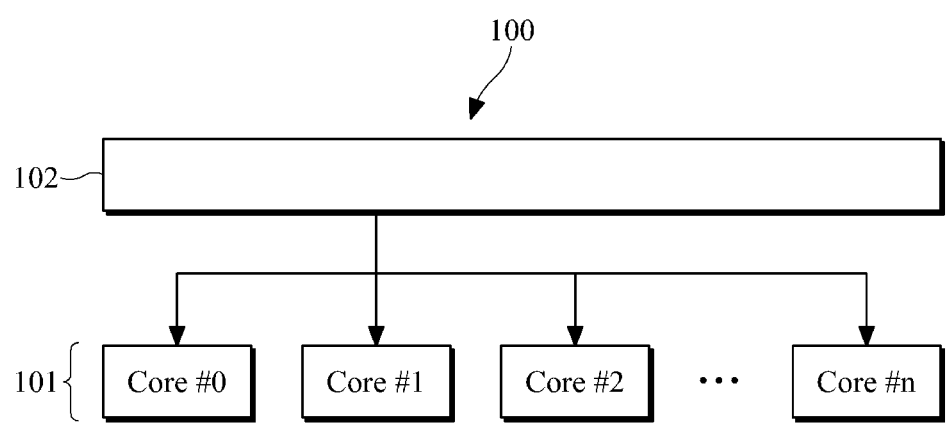
FIG. 1 is a diagram illustrating an example of an apparatus for processing an interrupt.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of an apparatus for processing an interrupt.

Referring to the example illustrated in FIG. 1, interrupt processing apparatus 100 includes a plurality of processing cores 101 (cores #0 . . . # n) and an interrupt distributing unit 102. For example, the interrupt processing apparatus may be included in a device that includes multiple cores such as a multi-core processor. The device that includes multiple cores may be included in various devices, for example, a mobile terminal, a computer, a personal digital assistant (PDA), an MP3 player, and the like.

As an example, each of the processing cores 101 may execute a program code in predefined execution mode. A program code executed in the processing core 101 may be, for example, a user application program, a kernel service, a handler for processing an exception or an interrupt, and the like. A program code may be executed in particular execution mode of each processing core 101. For example, a service code of a kernel may be executed in supervisor mode. As another example, a code for exception processing or interrupt processing may be executed in interrupt request (IRQ) mode (or exception mode). For example, when an interrupt occurs while the processing core 101 is executing a user application program in user mode, the processing core 101 may change its mode from the user mode to the IRQ mode and process the interrupt in the IRQ mode.

The interrupt distributing unit 102 may receive an interrupt from an interrupt source. The interrupt distributing unit 102 that has received the interrupt may determine whether the execution mode of each of the processing cores 101 is in IRQ mode. As an example, the execution mode may be identified by detecting a pin signal of each processing core 101 or a signal of a mode bus connected to the pin.

In response to determining whether each processing core 101 is in IRQ mode, the interrupt distributing unit 102 may transmit the received interrupt to one of processing cores (for example, core #0 or core #1) which in this example are not in IRQ mode.

For example, if the processing core (for example, core #2) is in IRQ mode and is processing an interrupt, when the interrupt is transmitted to the processing core (core #2) in IRQ mode, this may cause the processing of the previous interrupt to be stopped. This may cause a delay of the processing of the previous interrupt. As described in various examples herein, based on the execution mode of each processing core 101, the interrupt distributing unit 102 may transmit the received interrupt to a processing core (such as core #1) which is optimal to process the interrupt.

For example, the optimal processing core may be a processing core that has the best performance out of the plurality of processing cores. As another example, the optimal processing core may be a processing core that does not have the best performance, but that has a performance that satisfies a threshold value for performance.

As another example, if a plurality of processing cores (such as core #0 and core #1) are not in IRQ mode, one of the processing cores (core #0 and core #1) may be selected to process the interrupt. For example, a processing core may be selected by taking into consideration the performance of the processing cores (core #0 and core #1), and the interrupt may be transmitted to the selected processing core (for example, core #0). As an example, performance taken into consideration may be the number of interrupts that have been received previously by each processing core 101, and/or utilization and workload of each processing core 101.

Figure 2:
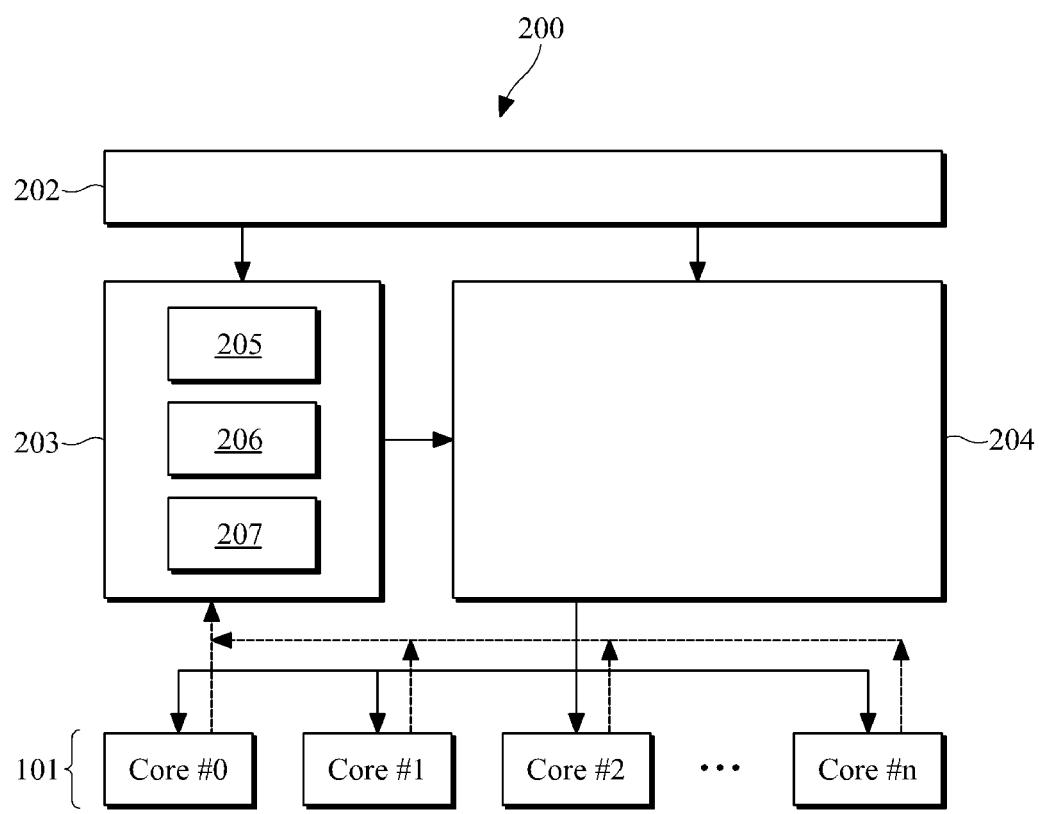
FIG. 2 is a diagram illustrating another example of an apparatus for processing an interrupt.

FIG. 2 illustrates another example of an apparatus for processing an interrupt.

Referring to the example illustrated in FIG. 2, interrupt processing apparatus 200 includes a plurality of processing cores 201 (cores #0 . . . # n), an interrupt receiving unit 202, a monitor unit 203, and an interrupt distributing unit 204.

As an example, each of the processing cores 201 may execute a program code in particular execution mode. The program code executed on each processing core 201 may be, for example, a user application program, a kernel service, a handler for processing an exception or an interrupt, and the like. A program code may be executed in particular mode of each processing core 201. For example, the user application program may be executed in user mode of the processing core. As another example, a service code of a kernel may be executed in supervisor mode of the processing core. A code for processing exception processing or interrupt processing may be executed in IRQ mode (or exception mode). For example, when an interrupt occurs while the processing core 201 is processing a user application program, the execution mode of the processing core 201 may be changed from the user mode into IRQ mode, and the processing core 201 may process the interrupt in the IRQ mode.

The interrupt receiving unit 202 may receive an interrupt from an interrupt source.

The monitor unit 203 may detect status/performance information of each processing core 201. For example, the status/performance information may include execution mode information, interrupt masking information, utilization, workload of each processing core 201, and the like. The monitor unit 203 may collect status/performance information in response to the interrupt receiving unit 202 receiving the interrupt. As another example, the monitor unit 203 may collect status/performance information regardless of the interrupt receiving unit 202.

The monitor unit 203 may include a plurality of monitor units. In the example illustrated in FIG. 2, the monitor unit 203 includes a first monitor unit 205, a second monitor unit 206, and a third monitor unit 207.

For example, the first monitor unit 205 may detect an execution mode of each processing core 201. For example, the first monitor unit 205 may identify whether the execution mode of each processing core 201 is in a user mode, a supervisor mode, an IRQ mode, and the like. The first monitor unit 205 may detect a pin signal of each processing core 201 or a signal of a mode bus connected to the pin to identify the execution mode.

The second monitor unit 206 may detect an interrupt masking status of each processing core 201. The interrupt masking status refers to a status of a processing core (for example, core #n) that indicates whether the processing core can receive the interrupt. For example, a register value of a given processing core (core #n) may be masked to 0 or 1 to prevent the processing core (core #n) from receiving an external interrupt signal. The interrupt masking status of each processing core 201 may be changed while executing a program code. The second monitor unit 206 may read out a register value that stores the interrupt masking status to determine the interrupt masking status.

The third monitor unit 207 may detect performance information of each processing core 201. For example, the performance information may include the number of interrupts that have been received previously by each processing core 201, and/or utilization or workload of each processing core 201. For example, the third monitor unit 207 may collect a workload of each processing core 201 for runtime to update usage or utilization of each processing core 201.

The interrupt distributing unit 204 may transmit the plurality of received interrupts to one or more of the processing cores 201 (for example, core #0) based on the status/performance information detected and collected by the monitor unit 203.

As an example, the interrupt distributing unit 204 may transmit the interrupt based on the execution mode detected by the first monitor unit 205. For example, the interrupt distributing unit 204 may provide the interrupt to one of processing cores (for example, cores #0, #1, and 2) which are detected as not being in the IRQ mode.

As another example, the interrupt distributing unit 204 may transmit the interrupt based on the execution mode detected by the first monitor unit 205 and the interrupt masking status detected by the second monitor unit 206. For example, the interrupt distributing unit 204 may select processing cores (for example, cores #0, #1, and #2) which are detected as not being in the IRQ mode, and provide the interrupt to one of the selected processing cores (cores #0, #1, and #2) which can receive the interrupt according to the interrupt masking status.

As another example, the interrupt distributing unit 204 may transmit the interrupt based on the execution mode detected by the first monitor unit 205, the interrupt masking status detected by the second monitor unit 206, and/or the performance information detected by the third monitor unit 207. For example, the interrupt distributing unit 204 may primarily select the processing cores (for example, cores #0, #1, and #2) which are detected as not being in the IRQ mode. As another example, the interrupt distributing unit 204 may secondly select processing cores (for example, cores #0 and #1) which can receive the interrupt, from the primarily selected processing cores (cores #0, #1, and #2) based on the interrupt masking status.

The interrupt distributing unit 204 may provide the interrupt to one of the secondly selected processing cores (for example, cores #0 and #1) which has received the smallest number of interrupts. In addition, one processing core (for example, core #1) which has larger utilization or smaller workload may be selected from the secondly selected processing cores (cores #0 and #1) and may be provided with the interrupt.

As an example, the interrupt distributing unit 204 may preliminarily select a candidate group of processing cores to process the interrupt based on the execution mode detected by the first monitor unit 205, and may determine a processing core out of the selected candidate group of processing cores to process the interrupt based on the detection result of the second monitor unit 206 and/or the detection result of the third monitor unit 207.

As another example, the interrupt distributing unit 204 may preliminarily select a candidate group of processing cores to receive the interrupt based on the detection result of the second monitor unit 206, and may determine a processing core out of the selected candidate group of processing cores to process the interrupt based on the detection result of the first monitor unit 205 and/or the detection result of the third monitor unit 207.

Figure 3:
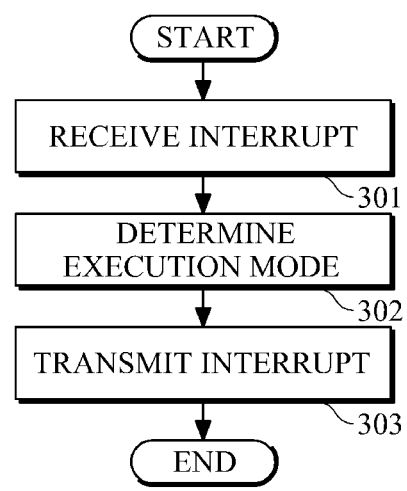
FIG. 3 is a flowchart illustrating an example of a method for processing an interrupt.

FIG. 3 illustrates an example of a method for processing an interrupt.

Referring to the examples illustrated in FIGS. 1 and 3, an interrupt is received, in 301. For example the interrupt distributing unit 102 may receive various interrupts to be processed by the processing cores 101 from an interrupt source.

In response to the reception of the interrupt, execution mode of each processing core 101 is determined, in 302. For example, the interrupt distributing unit 102 may detect a processing core that is not in an IRQ mode.

In response to the determination of execution mode, the interrupt is transmitted based on the determined execution mode, in 303. For example, the interrupt distributing unit 102 may provide the interrupt to a processing core that is not in IRQ mode. For example, if a plurality of processing cores are detected that are not in IRQ mode, the interrupt may be provided to a processing core with the smallest workload in consideration of performance of each processing core.

The method of FIG. 3 has been described with examples of performing the method by the apparatus of FIG. 1, however, other apparatus may perform the method of FIG. 3, for example, the apparatus of FIG. 2.

Figure 4A:
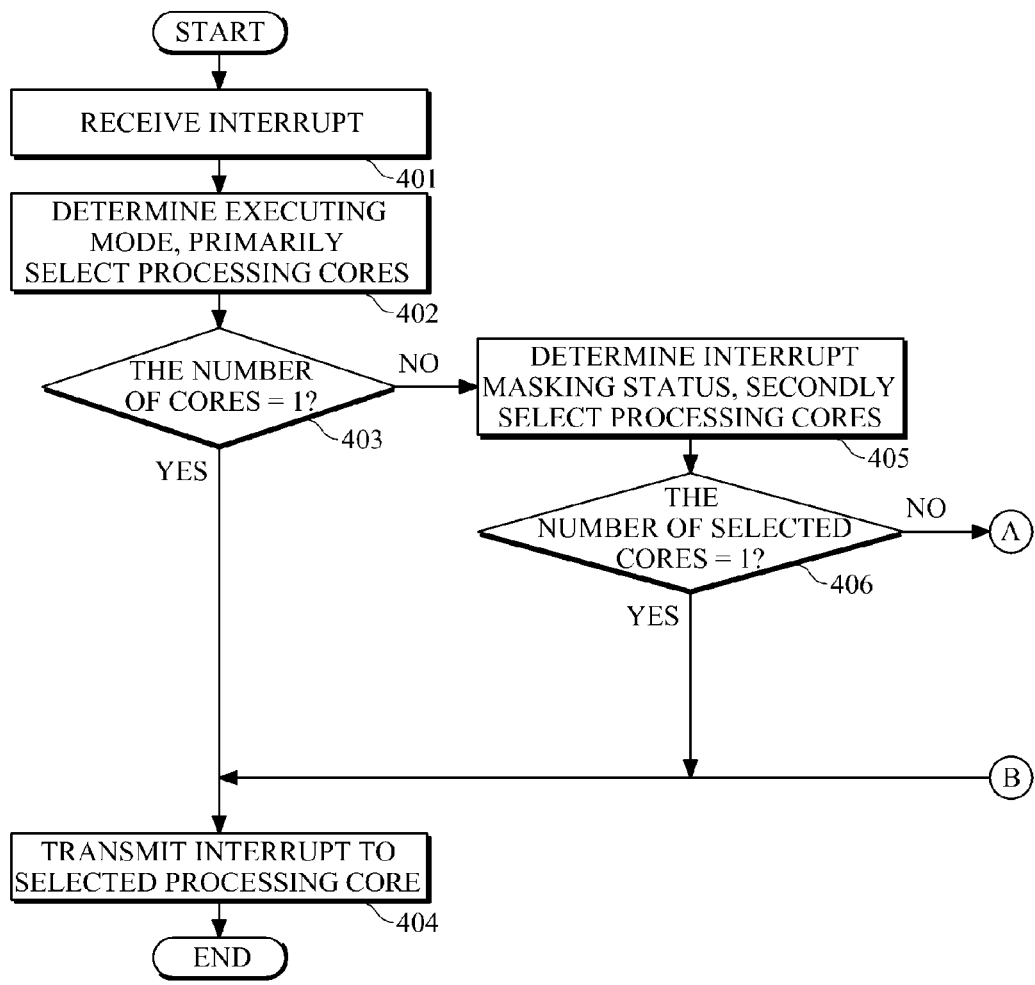
FIGS. 4A and 4B are flowcharts illustrating additional examples of methods for processing an interrupt.
Figure 4B:
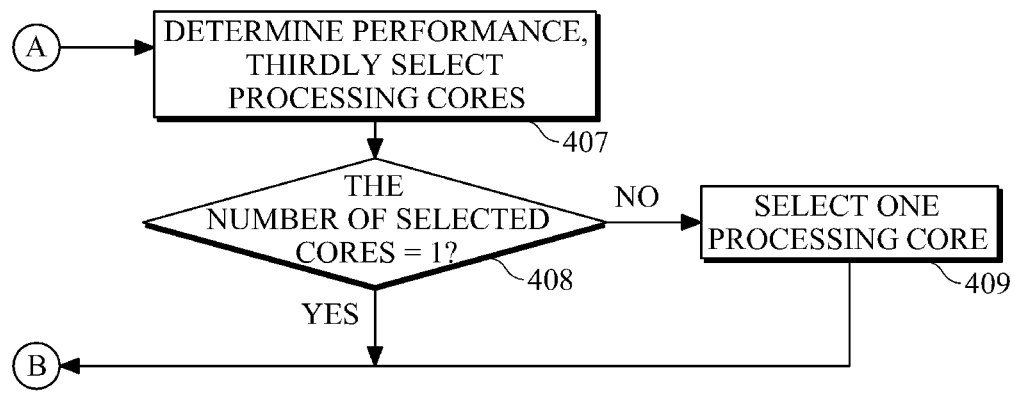

FIGS. 4A and 4B illustrate additional examples of a method for processing an interrupt.

Referring to the examples illustrated in FIGS. 2, 4A, and 4B, an interrupt is received, in 401. For example, the interrupt receiving unit 202 may receive various interrupts to be processed by the processing cores 201 from an interrupt source.

In response to the reception of the interrupt, the execution mode of each processing core is determined and processing cores to process the interrupt are primarily selected based on the determined execution mode, in 402. For example, the first monitor unit 205 may detect execution mode of each processing core 201, and the interrupt distributing unit 204 may select processing cores which are not in IRQ mode based on the detected execution mode.

In 403, it is determined whether there is only one primarily selected processing core. If only one processing core is primarily selected, the interrupt is transmitted to the selected processing core, in 404. However, if a plurality of processing cores are primarily selected, an interrupt masking status of each of the selected processing cores is identified, and processing cores to process the interrupt are secondly selected based on the identified interrupt masking status, in 405. For example, the second monitor unit 206 may detect whether each processing core 201 may receive the interrupt, and the interrupt distributing unit 204 may secondly select processing cores that may receive the interrupt from the primarily selected processing cores.

In 406, it is determined whether there is only one secondly selected processing core. If there is only one secondly selected processing core, the interrupt is transmitted to the processing core, in 404. However, if there are a plurality of secondly selected processing cores, the performance of each processing core is determined, and the processing cores to process the interrupt are thirdly selected based on the determined performance, in 407. For example, the third monitor unit 207 may detect the number of received interrupts, usage, and workload of each processing core 201, and the interrupt distributing unit 204 may thirdly select processing cores with the smallest workload from the secondly selected processing cores.

in 408, it is determined whether there is only one thirdly selected processing core, in 408. If there is only one thirdly selected processing core, the interrupt is transmitted to the processing core, in 404. However, if there are a plurality of thirdly selected processing cores, any one of the processing cores may be selected, in 409.

As described in various examples herein, an interrupt may be transmitted to a processing core that may be optimal to process the interrupt, and when a given processing core is processing an interrupt, another interrupt is not transmitted to this processing core. As a result, reduction in latency and overhead due to interrupt processing may occur.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or is replaced or supplemented by other components or their equivalents. Accordingly, other implementations are within the scope of the following claims.

What is claimed is:

1. An apparatus for processing an interrupt, the apparatus comprising:
   a plurality of processing cores, each configured to process an interrupt;
   a monitor unit configured to
      receive the interrupt,
      identify a processing mode of each processing core, from among an interrupt request (IRQ) mode in which another interrupt is currently being processed, and at least one other processing mode in which a program other than an interrupt is currently being processed, by detecting, in response to receiving the interrupt, a pin signal of each processing core or a signal of a mode bus connected to the pin,
   wherein the monitor unit comprises
      a first monitor unit configured to detect an execution mode of each processing core of the plurality of processing cores,
      a second monitor unit configured to detect an interrupt masking status of each processing core of the plurality of processing cores, and
      a third monitor unit configured to detect the number of interrupts received by each processing core, and utilization of each processing core; and
   an interrupt distributing unit configured to
      prevent the received interrupt from being provided to a processing core that is in the IRQ mode,
      select candidate processing cores to receive the interrupt, based on a processing mode of each processing core, where each respective processing mode is one of: an execution mode, a user mode, an interrupt request (IRQ) mode, and a supervisor mode, select a processing core from among the candidate processing cores to process the interrupt, based on a detected interrupt status and performance information of each candidate processing core, and provide the received interrupt to the selected processing core.

2. The apparatus of claim 1, wherein, in response to a plurality of processing cores not being in IRQ mode, the interrupt distributing unit is further configured to select a processing core, from among the plurality of processing cores not in IRQ mode, in consideration of a performance of each processing core, and provide the interrupt to the selected processing core.

3. The apparatus of claim 2, wherein the performance comprises information about at least one of the number of received interrupts of each processing core, the usage of each processing core, the utilization of each processing core, and the workload of each processing core.

4. The apparatus of claim 1, wherein the interrupt distributing unit identifies whether the execution mode of each processing core is in a mode from among a group of modes including at least a user mode in which a user application program is currently being processed, a supervisor mode in which a service code of a kernel is currently being processed, and the IRQ mode in which an interrupt is currently being processed.

5. The apparatus of claim 4, wherein the interrupt distributing unit provides the interrupt to a processing core that is in the user mode.

6. An apparatus for processing an interrupt, the apparatus comprising:

a plurality of processing cores;

a monitor unit configured to identify a processing mode of each processing core, from among an interrupt request (IRQ) mode in which an interrupt is currently being processed, and at least one other processing mode in which a program other than an interrupt is currently being processed, by detecting, in response to receiving the interrupt, a pin signal of each processing core or a signal of a mode bus connected to the pin, wherein the monitor unit comprises a first monitor unit configured to detect an execution mode of each processing core of the plurality of processing cores, a second monitor unit configured to detect an interrupt masking status of each processing core of the plurality of processing cores, and a third monitor unit configured to detect the number of interrupts received by each processing core, and utilization of each processing core; and an interrupt distributing unit configured to prevent a received interrupt from being provided to a processing core that is in the IRQ mode, select first processing cores which are detected as not being in IRQ mode, select second processing cores from the first processing cores, based on interrupt masking status, select one processing core, from the secondly processing cores, based on a number of interrupts or a utilization of the secondly processing cores, and provide the received interrupt to the selected one processing core.

7. The apparatus of claim 6, wherein the interrupt distributing unit is further configured to select a plurality of processing cores that are detected as not being in IRQ mode, and provide the interrupt to a processing core, from among the plurality of selected processing cores, based on the interrupt masking status.

8. A method for processing an interrupt in a device comprising multiple processing cores, the method comprising:

identifying a processing mode of each processing core, from among the plurality of processing cores, the identified processing mode being determined from among an interrupt request (IRQ) mode in which an interrupt is currently being processed;

identifying at least one other processing mode in which a program other than an interrupt is currently being processed, by detecting, in response to receiving the interrupt, a pin signal of each processing core or a signal of a mode bus connected to the pin, detecting an interrupt masking status of each processing core of the plurality of processing cores, and detecting the number of interrupts received by each processing core, and utilization of each processing core;

preventing the received interrupt from being provided to a processing core that is in the IRQ mode, and providing a received interrupt to one of the processing cores that is in one of the at least one other processing modes, comprising primarily selecting processing cores that are detected as not being in IRQ mode, secondly selecting processing cores from the firstly selected processing cores, based on the interrupt masking status, finally selecting one processing core, from the secondly selected processing cores, based on the number of interrupts or the utilization, and providing the interrupt to the finally selected processing core.

9. The method of claim 8, wherein the providing of the received interrupt comprises selecting a plurality of processing cores that are detected as not being in IRQ mode, and providing the interrupt to a processing core, from among the plurality of selected processing cores, based on the interrupt masking status.

* * * * *